United States Patent
Lathrop et al.

(10) Patent No.: US 7,053,570 B2
(45) Date of Patent: May 30, 2006

(54) CONTROL CIRCUIT FOR A DUAL DIRECTIONAL DIRECT CURRENT MOTOR EMPLOYING A SINGLE ALTERNATING CURRENT POWER SOURCE

(75) Inventors: Todd M. Lathrop, Freedom, PA (US); Derrick G. Berad, Monaca, PA (US); Ronald D. Hartzel, Penn Township, PA (US); James R. Hanna, Beaver, PA (US)

(73) Assignee: Eaton Corporation, Cleveland, OH (US)

( * ) Notice: Subject to any disclaimer, the term of this patent is extended or adjusted under 35 U.S.C. 154(b) by 246 days.

(21) Appl. No.: 10/724,945

(22) Filed: Dec. 1, 2003

(65) Prior Publication Data

US 2005/0116670 A1    Jun. 2, 2005

(51) Int. Cl.
*H02P 1/00* (2006.01)
*H02P 3/00* (2006.01)
*H02P 5/00* (2006.01)
*H02P 7/00* (2006.01)

(52) U.S. Cl. .................. 318/261; 318/273; 318/362; 318/370; 318/258

(58) Field of Classification Search ................. 318/261
See application file for complete search history.

(56) References Cited

U.S. PATENT DOCUMENTS

| | | | |
|---|---|---|---|
| 3,628,112 A * | 12/1971 | Gross | 318/258 |
| 3,665,275 A * | 5/1972 | Robinson | 318/261 |
| 3,781,617 A * | 12/1973 | Thomas | 318/261 |
| 3,798,518 A * | 3/1974 | Evan | 318/6 |
| 3,882,365 A * | 5/1975 | Yemington | 318/269 |
| 3,965,404 A * | 6/1976 | Petersen | 318/261 |
| 4,398,097 A | 8/1983 | Schell et al. | |
| 4,498,033 A * | 2/1985 | Aihara et al. | 318/261 |
| 4,556,831 A * | 12/1985 | Sakamoto et al. | 318/434 |
| 4,628,232 A * | 12/1986 | Saganovsky et al. | 318/284 |
| 4,639,647 A * | 1/1987 | Posma | 318/247 |
| 4,760,278 A | 7/1988 | Thomson | |
| 4,774,443 A * | 9/1988 | Herzig | 318/293 |
| 5,081,367 A | 1/1992 | Smith et al. | |
| 5,397,868 A | 3/1995 | Smith et al. | |
| 6,590,481 B1 | 7/2003 | Turner et al. | |

OTHER PUBLICATIONS

Cutler-Hammer, "Instructions for Cutler-Hammer Genswitch Automatic Transfer Switch (30-1000 Amperes)", I.B. ATS-G003, Dec. 1998, pp. i-vii, 1-35.

* cited by examiner

Primary Examiner—Marlon T. Fletcher
Assistant Examiner—Renata McCloud
(74) Attorney, Agent, or Firm—Martin J. Moran

(57) ABSTRACT

A control circuit operates a dual directional DC motor from an AC power source. A controller has first and second position indication inputs adapted to receive respective first and second position indications. The controller also has first and second direction outputs, which respectively energize one of two first relay coils having contacts outputting respective AC voltages responsive to the direction outputs. A full wave bridge rectifier receives the AC voltage and responsively outputs a DC voltage, which energizes a second relay coil. A contact thereof directs that voltage to two sets of first relay contacts, which are also responsive to the direction outputs, and which respectively provide a positive or negative DC voltage to the motor. Another second relay coil contact provides a braking action to the motor responsive to removal of the DC voltage from the rectifier output following removal of the AC voltage to the rectifier.

10 Claims, 3 Drawing Sheets

CONTROL CIRCUIT FOR A DUAL DIRECTIONAL DIRECT CURRENT MOTOR EMPLOYING A SINGLE ALTERNATING CURRENT POWER SOURCE

BACKGROUND OF THE INVENTION

1. Field of the Invention

The present invention relates to control circuits and, more particularly, to control circuits for motors and, still more particularly, such control circuits for a dual directional direct current (DC) motor employing a single alternating current (AC) power source.

2. Background Information

Alternate power sources are provided for any number of applications, which cannot withstand a lengthy interruption in electric power. Typically, power is provided from a primary source with back-up power provided by a secondary source. Often, the primary source is a utility and the secondary source is an auxiliary power source, such as an engine driven generator or a second utility source. The transfers between the two power sources can be made automatically or manually.

In the case of a generator driven auxiliary power source, power must be stabilized before the transfer can be made to the secondary source. In any event, the two power sources cannot be connected to the load simultaneously unless they are in phase. Thus, an open transition transfer may be employed in which the previously connected source is disconnected from the load before the other source is connected.

Transfer switches are known in the art. Transfer switches operate, for example, to transfer a power consuming load from a circuit with a normal power supply to a circuit with an auxiliary power supply. Applications for transfer switches include stand-by applications, among others, in which the auxiliary power supply stands-by if the normal power supply should fail. Facilities having a critical requirement for continuous electric power, such as hospitals, certain plant processes, computer installations, and the like, have a standby power source, often a diesel generator. A transfer switch controls connection of the utility lines and the diesel generator to the facility load buses. In many installations, the transfer switch automatically starts the standby generator and connects it to the load bus upon loss of utility power, and reconnects the utility power to the load bus if utility power is reestablished.

Some transfer switches affect an open transition between the power sources, that is, one is disconnected from the load bus before the other one is connected. Other transfer switches provide a closed transition wherein the oncoming source is connected to the load bus before the other is disconnected, in order that both power sources are connected in parallel during the transition.

Transfer switches commonly used to connect alternate power sources to a load, including networks, utilize a pair of switches each connecting one of the sources to the load. In order to prevent connecting unsynchronized sources together, the operation of the two switches is coordinated, typically by a mechanical interlock, in order that only one switch at a time can be turned on. In many instances, it is desirable to operate the transfer switch remotely. Typically, electric motors have been used to operate the interlocks on transfer switches. See, for example, U.S. Pat. Nos. 5,081, 367; 4,760,278; and 4,398,097.

A transfer switch typically comprises a pair of circuit interrupters combined with a drive input and a linkage system. The preferred types of circuit interrupters have been molded-case switches and molded-case circuit breakers because these types are commercially available in a wide array of sizes and are relatively economical compared to other options. The preferred type of drive input depends on the application for the transfer switch. Usually motors are preferred, but at other times there is a clear preference for manually-operated mechanisms.

One known automatic transfer switch employs a unidirectional motor. A motor-driven wheel rotates in one direction and employs a linkage to change the operating positions of two mounted switches (e.g., for a normal power source and an emergency power source) or two circuit breakers. The automatic transfer switch transfers between two power sources using a motor-driven arm that connects to a lever which operates both normal and emergency switches. The motor-driven lever operates in a ratchet-type operation. A rotational motion is created on an indicator wheel by the ratchet's operation.

There is room for improvement in control circuits for operating a dual directional direct current motor from a single alternating current power source.

SUMMARY OF THE INVENTION

These needs and others are met by the present invention, which allows automatic operation of, for example, a dual directional transfer mechanism with a single, high torque, direct current (DC) motor employing a single alternating current (AC) power source. An integral dynamic braking mechanism is included to instantaneously stop the rotation of the DC motor when the desired mechanism position has been obtained.

As one aspect of the invention, a control circuit operates a dual directional direct current motor from an alternating current power source, with the motor being operatively associated with a first position indication and a second position indication. The control circuit comprises: a first circuit structured to receive an alternating current voltage from the alternating current power source, the first circuit including a first output, a first direction input and the first position indication, the first output having a first alternating current voltage responsive to the first direction input and the first position indication, the first circuit further including a second output, a second direction input and the second position indication, the second output having a second alternating current voltage responsive to the second direction input and the second position indication; means for rectifying one of the first and second alternating current voltages from the first circuit and providing an output having a direct current voltage responsive to the first alternating current voltage and the second alternating current voltage; and a second circuit having an input energized responsive to at least one of the first and second outputs of the first circuit, the second circuit further having a first output when the input thereof is not energized and having a second output when the input thereof is energized, the first output of the second circuit enabling the means for rectifying to apply the direct current voltage to the motor at one of a first polarity and a second polarity, at least one of the first and second outputs of the second circuit providing a braking action to the motor responsive to removal of one of the first and second alternating current voltages of the first circuit.

The alternating current power source may be a redundant alternating current power source, and the first circuit may be structured for cooperation with the redundant alternating current power source.

As another aspect of the invention, a control circuit operates a dual directional direct current motor from an alternating current power source, the motor being operatively associated with a first position indication and a second position indication. The control circuit comprises: a controller including a first position indication input adapted to receive the first position indication, a second position indication input adapted to receive the second position indication, a first direction output and a second direction output; a first circuit structured for cooperation with the alternating current power source and the controller, the first circuit receiving the first direction output and the second direction output and including an output having an alternating current voltage responsive to one of the first direction output and the second direction output, the first circuit further including a first set of outputs responsive to the first direction output and a second set of outputs responsive to the second direction output; a rectifier receiving the alternating current voltage of the output of the first circuit and providing an output having a direct current voltage responsive to the alternating current voltage; and a second circuit responsive to the direct current voltage of the output of the rectifier, the second circuit providing a first output and a second output, the first output of the second circuit enabling the first set of outputs of the first circuit to provide the direct current voltage of the output of the rectifier to the motor at a first polarity, the first output of the second circuit alternatively enabling the second set of outputs of the first circuit to provide the direct current voltage of the output of the rectifier to the motor at a second polarity, the second output of the second circuit providing a braking action to the motor responsive to removal of the direct current voltage from the output of the rectifier following removal of the alternating current voltage from the output of the first circuit.

As another aspect of the invention, a control circuit operates a dual directional direct current motor from an alternating current power source, the motor being operatively associated with a first position indication and a second position indication. The control circuit comprises: a first circuit structured to receive an alternating current voltage from the alternating current power source, the first circuit including a first output, a first direction input and the first position indication, the first output having a first alternating current voltage responsive to the first direction input and the first position indication; a second circuit structured to receive the alternating current voltage from the alternating current power source, the second circuit including a second output, a second direction input and the second position indication, the second output having a second alternating current voltage responsive to the second direction input and the second position indication; a first rectifier receiving the first output of the first circuit and a ground or neutral of the alternating current power source, the first rectifier providing an output having a direct current voltage with a first polarity responsive to the first alternating current voltage of the first output of the first circuit; a second rectifier receiving the second output of the second circuit and the common or the neutral of the alternating current power source, the second rectifier providing an output having a direct current voltage with a second polarity responsive to the second alternating current voltage of the second output of the second circuit; and a third circuit having an input energized by the second alternating current voltage of the second output of the second circuit, the third circuit having a first output when the input thereof is not energized and having a second output when the input thereof is energized, the first output of the third circuit enabling the first rectifier to apply the direct current voltage with the first polarity of the output of the first rectifier to the motor, the second output of the third circuit enabling the second rectifier to apply the direct current voltage with the second polarity of the output of the second rectifier to the motor, the first output of the third circuit and the first rectifier providing a braking action to the motor responsive to removal of the second alternating current voltage of the second circuit.

The third circuit may be a relay having a coil energized by the alternating current voltage of the second output of the second circuit, a first contact which is closed when the coil thereof is not energized and having a second contact which is closed when the coil thereof is energized. The first contact of the third circuit may enable the first rectifier to apply the direct current voltage of the output of the first rectifier to the motor, and the second contact of the third circuit may enable the second rectifier to apply the direct current voltage of the output of the second rectifier to the motor.

The coil may not be energized when the first contact is closed. The first rectifier may be adapted to providing braking to the motor. The first rectifier may include a pair of diodes, which are electrically connected in series with the first contact, with the series combination of the pair of diodes and the first contact being adapted to be electrically connected in parallel with the motor.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
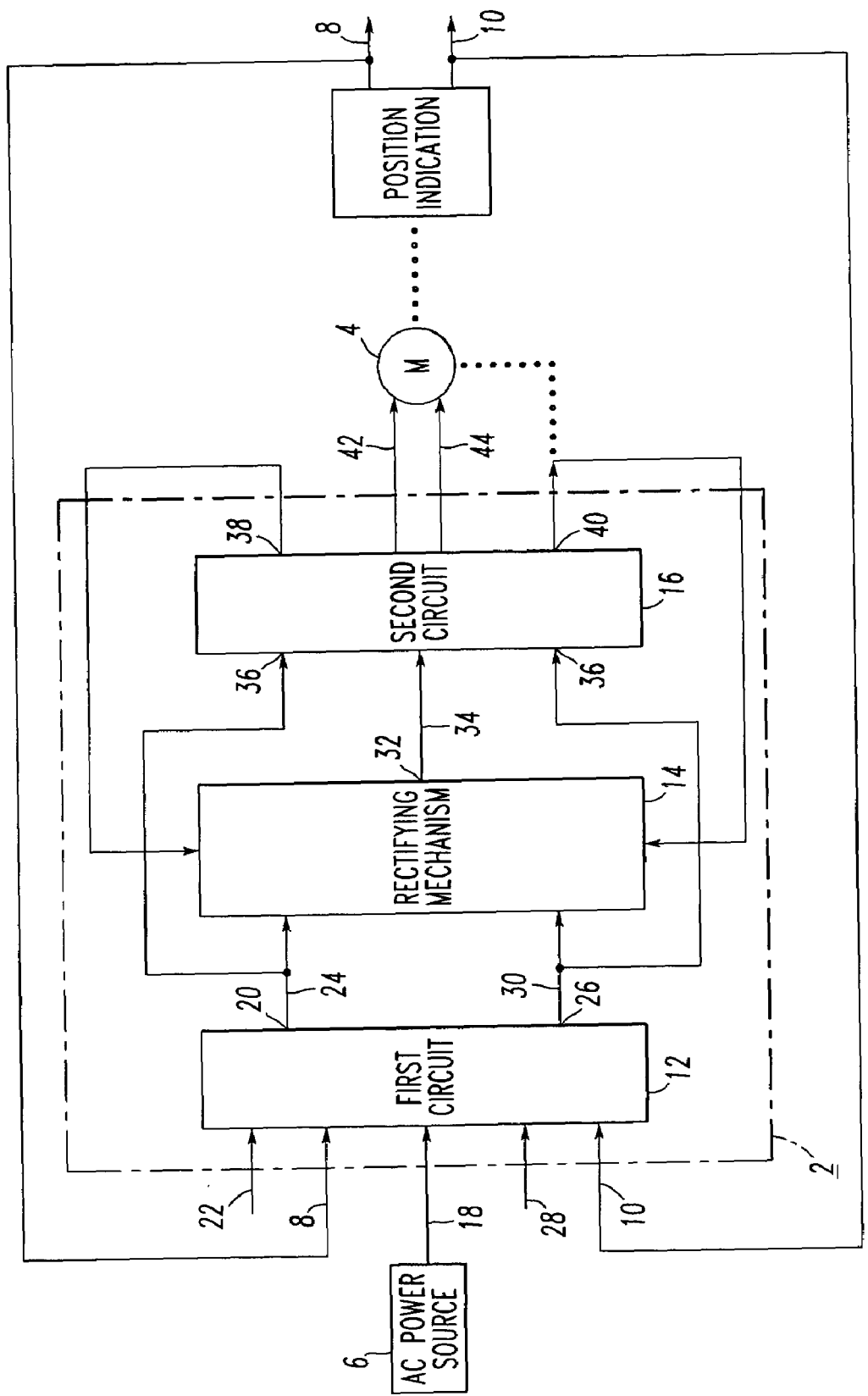
FIG. 1 is a block diagram of a control circuit in accordance with the present invention.

FIG. 1 shows a control circuit 2 for operating a dual directional direct current (DC) motor (M) 4 from an alternating current (AC) power source 6. The motor 4 is operatively associated with a first position indication 8 (e.g., clockwise) and a second position indication 10 (e.g., counter-clockwise) for such motor. The control circuit 2 includes a first circuit 12, a rectifying mechanism 14 and a second circuit 16. The first circuit 12 is structured to receive an AC voltage 18 from the AC power source 6. The first circuit 12 includes a first output 20, a first direction input 22 (e.g., clockwise) and the first position indication 8. The first output 20 has a first AC voltage 24 responsive to the first direction input 22 and the first position indication 8. The first circuit 12 further includes a second output 26, a second direction input 28 (e.g., counter-clockwise) and the second position indication 10. The second output 26 has a second AC voltage 30 responsive to the second direction input 28 and the second position indication 10.

The rectifying mechanism 14 (e.g., an AC/DC converter; a single rectifier, such as a full wave diode bridge; a pair of rectifiers) rectifies one of the first and second AC voltages 24,30 from the first circuit 12 and provides an output 32 having a DC voltage 34 responsive to the first and second AC voltages 24,30.

The second circuit 16 has an input 36 energized responsive to one or both of the first and second outputs 20,26 of the first circuit 12. The second circuit 16 further has a first output 38 when the input 36 thereof is not energized and has a second output 40 when the input 36 thereof is energized. The first output 38 of the second circuit 16 enables the rectifying mechanism 14 to apply the DC voltage 34 to the motor 4 at one of a first polarity 42 and a second polarity 44. One of the first and second outputs 38,40 of the second circuit 16 provides a braking action to the motor 4 responsive to removal of one or both the first and second AC voltages 24,30 of the first circuit 12.

Figure 2:
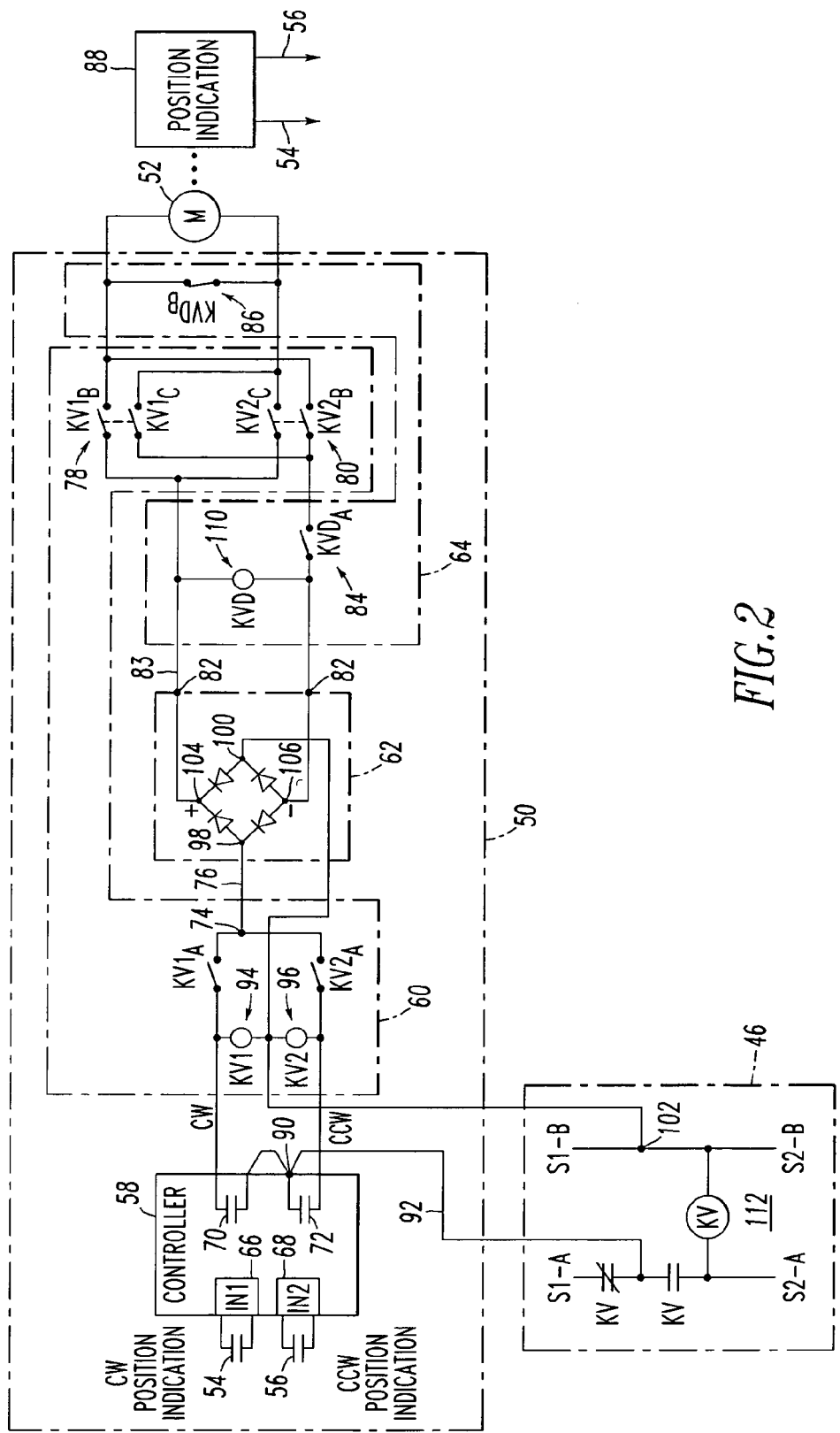
FIG. 2 is a block diagram in schematic form of a control circuit in accordance with an embodiment of the present invention.
Figure 3:
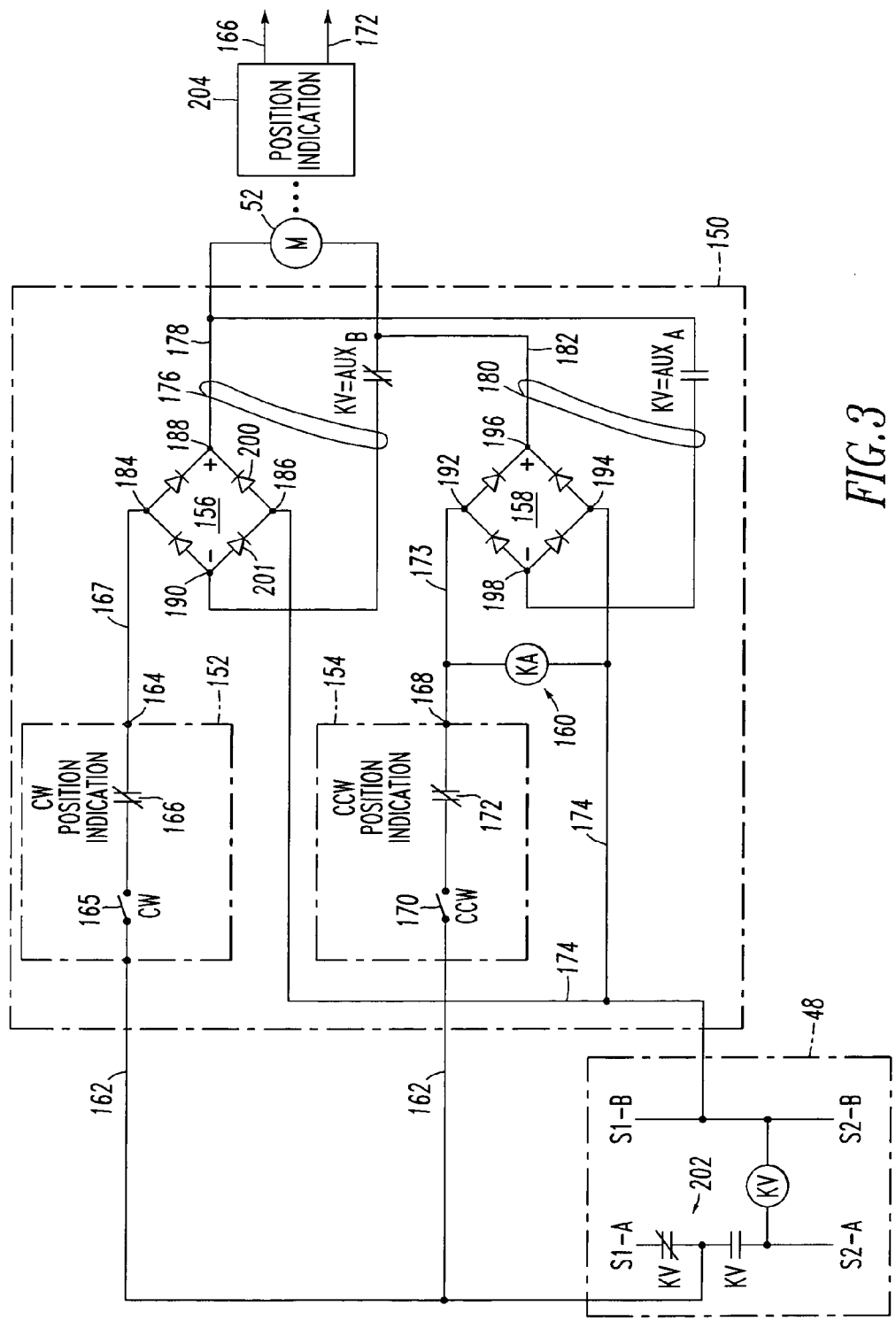
FIG. 3 is a block diagram in schematic form of a control circuit in accordance with another embodiment of the present invention.

The AC power source 6 may be any suitable AC power source, or may be a redundant AC power source (e.g., as shown with power source 46 of FIG. 2 or power source 48 of FIG. 3). The first circuit 12 is structured for cooperation with the AC power source 6.

Referring to FIG. 2, a control circuit 50 operates a dual directional DC motor (M) 52 from the AC power source 46. The motor 52 is operatively associated with a first position indication 54 and a second position indication 56. The control circuit 50 includes a suitable controller 58, a first circuit 60, a rectifier 62 and a second circuit 64.

The controller 58 (e.g., a microprocessor-based controller; a logic controller; a programmable logic controller; relay logic; digital logic; analog logic; any suitable control mechanism or circuit) includes a first position indication input (IN1) 66 adapted to receive the first position indication 54 (e.g., a clockwise (CW) position indication normally open contact), a second position indication input (IN2) 68 adapted to receive the second position indication 56 (e.g., a counter-clockwise (CCW) position indication normally open contact), a first direction output 70 (e.g., a clockwise normally open contact output) and a second direction output 72 (e.g., a counter-clockwise normally open contact output).

The first circuit 60, which is structured for cooperation with the AC power source 46 and the controller 58, receives the first direction output 70 and the second direction output 72 and includes an output 74 having an AC voltage 76 responsive to one of the first direction output 70 and the second direction output 72. The first circuit 60 further includes a first set of outputs 78 responsive to the first direction output 70 and a second set of outputs 80 responsive to the second direction output 72.

The rectifier 62 receives the AC voltage 76 of the first circuit output 74 and provides an output 82 having a DC voltage 83 responsive to the AC voltage 76.

The second circuit 64 is responsive to the DC voltage 83 of the rectifier output 82 and provides a first output 84 and a second output 86. The second circuit first output 84 (e.g., when normally open contact $KVD_A$ is closed) enables the first circuit first set of outputs 78 (e.g., when normally open contacts $KV1_B$, $KV1_C$ are closed) to provide the rectifier output DC voltage 83 to the motor 52 at a first polarity (e.g., positive). The second circuit first output 84 (e.g., when normally open contact $KVD_A$ is closed) alternatively enables the first circuit second set of outputs 80 (e.g., when normally open contacts $KV2_B$, $KV2_C$ are closed) to provide the rectifier output DC voltage 83 to the motor 52 at a second polarity (e.g., negative). Also, the second circuit second output 86 provides a braking action (e.g., when the normally closed contact $KVD_B$ is closed) to the motor 52 responsive to removal of the rectifier output DC voltage 83 following removal of the AC voltage 76 from the first circuit output 74.

As shown in FIG. 2, the motor 52 may be operatively associated with a suitable position indication circuit, such as a dual directional transfer mechanism 88, which provides the position indications 54,56.

The AC power source 46, in this example, is a redundant AC power source. The first circuit 60 is structured for cooperation with the power source 46. The contact outputs 70,72 are electrically connected in series with a common terminal 90, which is adapted to receive an AC voltage 92 from the AC power source 46.

The first circuit 60 includes a first relay 94 having three contacts $KV1_A$, $KV1_B$, $KV1_C$ operated by a first coil KV1 and a second relay 96 having three contacts $KV2_A$, $KV2_B$, $KV2_C$ operated by a second coil KV2. The first coil KV1 is energized by the closed first direction output 70, and the second coil KV2 is energized by the closed second direction output 72. The first relay contact $KV1_A$ provides the output 74 having the AC voltage 76 responsive to the first direction output 70, and the second relay contact $KV2_A$ provides the same output 74 having the AC voltage 76 responsive to the second direction output 72. The pair of contacts $KV1_B$, $KV1_C$ of the first relay 94 provides the DC voltage 83 from the rectifier output 82 to the motor 52 at a positive polarity, and the pair of contacts $KV2_B$, $KV2_C$ of the second relay 96 provides the DC voltage 83 from the rectifier output 82 to the motor 52 at a negative polarity.

The exemplary rectifier 62 is a full-wave diode bridge, although any suitable AC to DC rectifier or other suitable AC to DC converter may be employed. The rectifier 62 includes a first terminal 98 receiving the first circuit output 74, a second terminal 100 adapted to receive a ground or neutral 102 from the AC power source 46 and the first circuit 60, and third and fourth terminals 104,106 providing the DC voltage output 82 responsive to the first circuit AC voltage 76.

The exemplary second circuit 64 is a relay 110 having a coil KVD, a normally open first contact $KVD_A$ and a normally closed second contact $KVD_B$. The second circuit relay coil KVD is responsive to the rectifier output DC voltage 83, with the contact $KVD_A$, when closed, enabling the contacts $KV1_B$, $KV1_C$, in order to provide the DC voltage 83 from the rectifier 62 to the motor 52 at a positive polarity, or enabling the contacts $KV2_B$, $KV2_C$, in order to provide the DC voltage 83 from the rectifier 62 to the motor 52 at a negative polarity. Also, the second circuit relay contact $KVD_B$, which is electrically connected in parallel with the windings (not shown) of the motor 52, when closed, provides a braking action to the motor 52.

The first circuit 60 obtains directional inputs, clockwise (CW) or counter-clockwise (CCW), from the two respective contacts 70 or 72 of the controller 58. Zero or one (and at most one) of such directional inputs is closed at any one time. In this example, AC power to the control circuit 50 is supplied from a "voting" circuit 112, with the AC voltage 92 being common to both of the directional inputs CW,CCW. Also, in this example, the directional inputs CW,CCW are controlled via the outputs 70,72 in view of the two respective position indication (e.g., limit) switches 54,56. For example, these switches 54,56 signal the controller 58 that the mechanical motion of the motor 52 is satisfied. In response, the controller 58 opens the corresponding one of the directional inputs, CW or CCW, such that both such directional inputs are open, in order to remove power from the first circuit 60. In turn, the dynamic brake, contact $KVD_B$, stops the motor 52 by shorting the motor windings (not shown).

The control circuit 50 provides counter-clockwise direction control as follows. Initially, the CW position indication 54 is closed, and both of the CW and CCW outputs 70,72 are open. Hence, the first circuit 60 is without AC power and, thus, the relay coils KV1 and KV2 are both de-energized. The normally open contacts $KV1_A$ and $KV2_A$ are both open and no AC voltage is applied to the rectifier 62. As a result, the relay coil KVD is de-energized. Therefore, the normally closed contact $KVD_B$ is closed, which brakes the DC motor 52.

Next, for CCW operation, the CCW output 72 closes (e.g., due to a command from the controller 58). This supplies AC power from the voting circuit 112 to the relay coil KV2. In response, the normally open contacts $KV2_A$, $KV2_B$ and $KV2_C$ close. Then, AC power is supplied through the, now closed, normally open contact $KV2_A$ to the rectifier 62, which converts the AC power into DC power. The rectifier 62 energizes the relay coil KVD. In response, the normally open contact $KVD_A$ closes and the normally closed contact $KVD_B$ opens. It will be appreciated that the normally open contact $KVD_A$ and the normally closed contact $KVD_B$ are "break before make". When the normally closed contact $KVD_B$ opens, this releases the dynamic brake on the motor 52. When the normally open contact $KVD_A$ closes, a positive DC voltage is applied through closed normally open contact $KV2_C$ and a negative DC voltage is applied through closed normally open contact $KV2_B$. This polarity configuration applies a negative voltage to the motor 52, which allows such motor to rotate in a counter-clockwise direction in order to do mechanical work.

Once the mechanical motion of the motor 52 is completed, the CCW position indication 56 closes. The controller 58 senses this closure and opens the CCW output contact 72. This removes AC power from the voting circuit 112 to the relay coil KV2. In response, the normally open contacts $KV2_A$, $KV2_B$ and $KV2_C$ open. The open state of the normally open contact $KV2_A$ removes AC power from the rectifier 62, which removes DC power from the relay coil KVD. In response, the normally open contact $KVD_A$ opens and the normally closed contact $KVD_B$ closes. This, first, removes DC power from the motor 52 after which the normally closed contact $KVD_B$ shorts out the motor windings (not shown) and dynamically brakes the motor 52 to stop rotation.

The control circuit 50 provides clockwise direction control in an analogous manner as counter-clockwise direction control. Initially, the CCW position indication 56 is closed, and both of the CW and CCW outputs 70,72 are open. Hence, the first circuit 60 is without AC power and, thus, the relay coils KV1 and KV2 are de-energized. The normally open contacts $KV1_A$ and $KV2_A$ are open and no AC voltage is applied to the rectifier 62. As a result, the relay coil KVD is de-energized. The normally closed contact $KVD_B$ is closed, which brakes the DC motor 52.

Next, the CW output 70 closes (e.g., due to a command from the controller 58). This supplies AC power from the voting circuit 112 to the relay coil KV1. In response, the normally open contacts $KV1_A$, $KV1_B$ and $KV1_C$ close. Then, AC power is supplied through the, now closed, normally open contact $KV1_A$ to the rectifier 62, which converts the AC power into DC power. This energizes the relay coil KVD. In response, the normally open contact $KVD_A$ closes and the normally closed contact $KVD_B$ opens. When the normally closed contact $KVD_B$ opens, this releases the dynamic brake on the motor 52. When the normally open contact $KVD_A$ closes, a positive DC voltage is applied to closed normally open contact $KV1_B$ and a negative DC voltage is applied to closed normally open contact $KV1_C$. This polarity configuration applies a positive DC voltage to the motor 52, which allows such motor to rotate in a clockwise direction in order to do mechanical work.

Once the mechanical motion of the motor 52 is completed, the CW position indication 54 closes. The controller 58 senses this closure and opens the CW output contact 70. This removes AC power from the voting circuit 112 to the relay coil KV1. In response, the normally open contacts $KV1_A$, $KV1_B$ and $KV1_C$ open. The open state of the normally open contact $KV1_A$ removes AC power from the rectifier 62, which removes DC power from the relay coil KVD. In response, the normally open contact $KVD_A$ opens and the normally closed contact $KVD_B$ closes. This, first, removes DC power from the motor 52 after which the normally closed contact $KVD_B$ shorts out the motor windings (not shown) and dynamically brakes the motor 52 to stop rotation.

Although a voting circuit 112 for two (e.g., S1 and S2) AC power sources is disclosed, the invention is applicable to a one-input AC power source (e.g., S1 or S2), which does not employ a voting circuit, or to two, three (not shown) or more AC power sources, which employ suitable AC power source selection logic (not shown).

The individual AC power sources (e.g., S1; S2) may employ any suitable AC line-to-line voltage, any suitable AC line-to-neutral voltage (e.g., between (e.g., S1-A and S1-B), or any suitable AC voltage (e.g., as obtained from the secondary of a transformer).

Referring to FIG. 3, a control circuit 150 operates the dual directional DC motor (M) 52 from the AC power source 48. The control circuit 150 includes a first circuit 152, a second circuit 154, a first rectifier 156, a second rectifier 158, and a third circuit 160. The exemplary rectifiers 156,158 are full-wave diode bridges, although any suitable AC to DC rectifier or other suitable AC to DC converter may be employed. The first circuit 152 is structured to receive an AC voltage 162 from the AC power source 48. The first circuit 152 includes a first output 164, a first direction input 165 (e.g., CW) and a first position indication 166. The first output 164 has a first AC voltage 167 responsive to the first direction input 165 and the first position indication 166.

The second circuit 154 is structured to receive the AC voltage 162 from the AC power source 48. In this example, the power is common to both of the CW and CCW directional inputs 165,170. The second circuit 154 includes a second output 168, a second direction input 170 (e.g., CCW) and a second position indication 172. The second output 168 has a second AC voltage 173 responsive to the second direction input 170 and the second position indication 172.

The first rectifier 156 receives the first circuit first output 164 and a ground or neutral 174 of the AC power source 48. The first rectifier 156 provides an output 176 having a DC voltage 178 with a positive polarity (with respect to the motor 52) responsive to the first AC voltage 167.

The second rectifier 158 receives second circuit second output 168 and the common or the neutral 174 of the AC power source 48. The second rectifier 158 provides an output 180 having a DC voltage 182 with a negative polarity (with respect to the motor 52) responsive to the second AC voltage 173.

The third circuit 160 is a relay, which includes an input, such as coil KA, energized by the second AC voltage 173, a first output, such as normally closed contact $AUX_B$, which is closed when the coil KA is not energized, and a second output, such as normally open contact $AUX_A$, which is closed when the coil KA is energized. The normally closed contact $AUX_B$ enables the first rectifier 156 to apply the positive DC voltage 178 to the motor 52. The normally open contact $AUX_A$ enables the second rectifier 158 to apply the negative DC voltage 182 to the motor 52. The normally closed contact $AUX_B$ provides a braking action to the motor 52 through the first rectifier 156 responsive to removal of the second AC voltage 173 of the second circuit 154, which de-energizes the coil KA. The first rectifier 156 includes the diodes 200,201, which are electrically connected in series with the normally closed contact $AUX_B$, with the series combination of the diodes 200,201 and that contact being electrically connected in parallel with the motor windings (not shown) of the motor 52.

The first rectifier 156 includes a first terminal 184 receiving the first circuit first output 164, a second terminal 186 adapted to receive the ground or neutral 174, and third and fourth terminals 188,190 providing the first output DC voltage 178.

The second rectifier 158 includes a first terminal 192 receiving the second circuit second output 168, a second terminal 194 adapted to receive the ground or neutral 174, and third and fourth terminals 196,198 providing the second output DC voltage 182.

The two directional inputs 165,170 (e.g., clockwise (CW) and counter-clockwise (CCW)) may be controlled by two separate contacts from any suitable circuit or controller (not shown) (e.g., the microprocessor-based controller 58 of FIG. 2). Power from the power source 48 is preferably supplied via a suitable "voting" circuit 202, although a single AC power source may be employed.

In this example, the CW and CCW directional inputs 165,170 are controlled in view of two position indication (e.g., limit) switches CW position and CCW position 166, 172, respectively. These position indication switches 166, 172 signal that the mechanical motion of the motor 52 is satisfied. The circuits 152,154 then remove power from the rest of the control circuit 150.

The control circuit 150 provides clockwise direction control as follows. Initially, the normally closed CCW position indication 172 is open, the normally closed CW position indication 166 is closed, and both of the CW and CCW outputs 165,170 are open. As a result, the coil KA of the auxiliary relay 160 remains de-energized and the corresponding normally open $AUX_A$ and normally closed $AUX_B$ auxiliary contacts do not change state.

The contacts $AUX_B$, $AUX_A$ isolate the first and second rectifiers 156,158 from one another. Hence, the purpose of the auxiliary relay 160 is to isolate the two rectifiers 156, 158. This is employed because the positive output 176 of the first rectifier 156 would otherwise, be directly electrically connected to the negative output 180 of the second rectifier 158 and visa versa. Thus, without the auxiliary relay 160, a direct short would occur anytime power was supplied to either of the two rectifiers 156,158.

Next, the CW output 165 closes (e.g., due to a command from a controller (not shown)). This supplies AC power from the voting circuit 202 through the closed CW output 165 and through the normally closed CW position indication 166. As a result, AC power is supplied to the first rectifier 156, which converts the AC power into DC power, which is supplied to the DC motor 52 though the normally closed contact $AUX_B$. This polarity configuration allows the motor 52 to rotate in a clockwise direction. Once the mechanical motion is completed, the normally closed CW position indication 166 opens, which removes power from the first rectifier 156. For example, the CW contact 165 may be controlled by a suitable controller (not shown) or by manual operation. The motor 52 is not stopped dynamically in this direction.

Except for braking operation, the control circuit 150 provides counter-clockwise direction control in an generally analogous manner as clockwise direction control. Initially, the normally closed CW position indication 166 is open, the normally closed CCW position indication 172 is closed, and both of the CW and CCW outputs 165,170 are open. As a result, the coil KA of the auxiliary relay 160 remains de-energized and the corresponding normally open and normally closed auxiliary contacts $AUX_A$, $AUX_B$ do not change state.

Next, the CCW output 170 closes (e.g., due to a command from a controller (not shown)). This supplies AC power from the voting circuit 202 through the closed CCW output 170 and through the normally closed CCW position indication 172. As a result, the auxiliary relay coil KA is energized and the corresponding normally open and normally closed auxiliary contacts $AUX_A$, $AUX_B$ change state.

As a result, AC power is supplied to the second rectifier 158, which converts the AC power into DC power, which is supplied to the DC motor 52 though the, now closed, normally open contact $AUX_A$. This polarity configuration allows the motor 52 to rotate in a counter-clockwise direction. Once the mechanical motion is completed, the normally closed CCW position indication 172 opens, which removes power from the second rectifier 158. For example, the CCW contact 170 may be controlled by a suitable controller (not shown) or by manual operation.

As one difference from the clockwise direction control, the motor 52 is dynamically stopped in the counter-clockwise direction through the first (CW) rectifier 156. This is because when the normally closed CCW position indication 172 opens, the relay coil KA is de-energized. As a result, the now closed, normally closed contact $AUX_B$ provides an electrically conductive path from the motor 52 and through the two lower diodes 200,201 of the first rectifier 156. Since one or both of the normally closed CW position indication 166 and the CW output 165 are open, there is no external DC voltage applied to the motor 52.

Although CW and CCW output contacts 165,170 are shown, any suitable contacts or other suitable mutually exclusive outputs may be employed to control the direction of a motor from any suitable switching device.

The normally closed position indications CW 166 and CCW 172 are employed to remove power from the respective rectifiers 156 and 158 when the desired mechanical position is obtained.

The present control circuits 50,150 are for use with, but not limited to, dual directional transfer mechanisms, such as transfer mechanism 204 of FIG. 3. Such a transfer mechanism 204 may employ, for example, a double-pole, double-throw contactor/switch or other like switching device (not shown). For example, the motor 52 rotates both clockwise and counter-clockwise, in order to change the state of the switching device. Alternatively, the control circuits 50,150 may be employed with any suitable transfer switch (e.g., employing two circuit breakers (not shown)).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A control circuit for operating a dual directional direct current motor from an alternating current power source, said motor being operatively associated with a first position indication and a second position indication, said control circuit comprising:

a first circuit structured to receive an alternating current voltage from said alternating current power source, said first circuit including a first output, a first direction input and said first position indication, said first output having a first alternating current voltage responsive to said first direction input and said first position indication;

a second circuit structured to receive the alternating current voltage from said alternating current power source, said second circuit including a second output, a second direction input and said second position indication, said second output having a second alternating current voltage responsive to said second direction input and said second position indication;

a first rectifier receiving the first output of said first circuit and a ground or neutral of said alternating current power source, said first rectifier providing an output having a direct current voltage with a first polarity responsive to the first alternating current voltage of the first output of said first circuit;

a second rectifier receiving the second output of said second circuit and the common or the neutral of said alternating current power source, said second rectifier providing an output having a direct current voltage with a second polarity responsive to the second alternating current voltage of the second output of said second circuit; and a third circuit having an input energized by the second alternating current voltage of the second output of said second circuit, said third circuit having a first output when the input thereof is not energized and having a second output when the input thereof is energized, the first output of said third circuit enabling said first rectifier to apply the direct current voltage with the first polarity of the output of said first rectifier to said motor, the second output of said third circuit enabling said second rectifier to apply the direct current voltage with the second polarity of the output of said second rectifier to said motor, the first output of said third circuit and said first rectifier providing a braking action to said motor responsive to removal of the second alternating current voltage of said second circuit.

2. The control circuit of claim 1 wherein said first circuit includes a first contact electrically connected in series wit a second contact, said first contact being said first direction input and said second contact being said first position indication, one end of the series combination of said first and second contacts being adapted to receive the alternating current voltage from said alternating current power source, the other end of the series combination of said first and second contacts providing the first output of said first circuit.

3. The control circuit of claim 1 wherein said second circuit includes a first contact electrically connected in series with a second contact, said first contact being said second direction input and said second contact being said second position indication, one end of the series combination of said first and second contacts being adapted to receive the alternating current voltage from said alternating current power source, the other end of the series combination of said first and second contacts providing the second output of said second circuit.

4. The control circuit of claim 1 wherein said first rectifier is a full-wave diode bridge including a first terminal receiving the first output of said first circuit, a second terminal adapted to receive the ground or neutral from said alternating current power source, and third and fourth terminals providing the first output having the direct current voltage.

5. The control circuit of claim 1 wherein said second rectifier is a full-wave diode bridge including a first terminal receiving the second output of said second circuit a second terminal adapted to receive the ground or neutral from said alternating current power source, and third and fourth terminals providing the second output having the direct current voltage.

6. The control circuit of claim 1 wherein said third circuit is a relay having a coil energized by the alternating current voltage of the second output of said second circuit, a first contact which is closed when the coil thereof is not energized and having a second contact which is closed when the coil thereof is energized, the first contact of said third circuit enabling said first rectifier to apply the direct current voltage of the output of said first rectifier to said motor, the second contact of said third circuit enabling said second rectifier to apply the direct current voltage of the output of said second rectifier to said motor.

7. The control circuit of claim 6 wherein when said coil is not energized and said first contact is closed, said first rectifier is adapted to providing braking to said motor.

8. The control circuit of claim 7 wherein said first rectifier includes a pair of diodes, which are electrically connected in series with said first contact, with the series combination of said pair of diodes and said first contact being adapted to be electrically connected in parallel with said motor.

9. A control circuit for operating a dual directional direct current motor from an alternating current power source, said motor being operatively associated with a first position indication and a second position indication, said control circuit comprising:

a controller including a first position indication input adapted to receive said first position indication, a second position indication input adapted to receive said second position indication, a first direction output and a second direction output;

a first circuit structured for cooperation with said alternating current power source and said controller, said first circuit receiving said first direction output and said second direction output and including an output having an alternating current voltage responsive to one of said first direction output and said second direction output, said first circuit further including a first set of outputs responsive to said first direction output and a second set of outputs responsive to said second direction output;

a rectifier receiving the alternating current voltage of the output of said first circuit and providing an output having a direct current voltage responsive to said alternating current voltage;

a second circuit responsive to the direct current voltage of the output of said rectifier, said second circuit providing a first output and a second output, said first output of said second circuit enabling the first set of outputs of said first circuit to provide the direct current voltage of the output of said rectifier to said motor at a first polarity, said first output of said second circuit alternatively enabling the second set of outputs of said first circuit to provide the direct current voltage of the output of said rectifier to said motor at a second polarity, said second output of said second circuit providing a braking action to said motor responsive to removal of the direct current voltage from the output of said rectifier following removal of the alternating current voltage from the output of said first circuit; and wherein said second circuit is a relay having a coil, a first contact and a second contact, the coil of the relay of said second circuit being responsive to the direct current voltage of the output of said rectifier, the first contact of the relay of said second circuit being the first output of said second circuit enabling the first set of outputs of said first circuit to provide the direct current voltage of the output of said rectifier to said motor at the first polarity or enabling the second set of outputs of said first circuit to provide the direct current voltage of the output of said rectifier to said motor at the second polarity, the second contact of the relay of said second circuit being the second output of said second circuit providing the braking action to said motor.

10. The control circuit of claim 9 wherein said second contact of the relay of said second circuit is adapted to be electrically connected in parallel with said motor.

* * * * *